(12) United States Patent
Wu et al.

(10) Patent No.: US 8,629,639 B2
(45) Date of Patent: Jan. 14, 2014

(54) BRUSHLESS DIRECT CURRENT MOTOR AND DRIVING UNIT THEREOF

(75) Inventors: Yen-Hung Wu, Taoyuan Hsien (TW); Tsung-Jung Hsieh, Taoyuan Hsien (TW); Yueh-Lung Huang, Taoyuan Hsien (TW)

(73) Assignee: Delta Electronics, Inc., Kuei San, Taoyun Hsien (TW)

( * ) Notice: Subject to any disclaimer, the term of this patent is extended or adjusted under 35 U.S.C. 154(b) by 681 days.

(21) Appl. No.: 12/397,867

(22) Filed: Mar. 4, 2009

(65) Prior Publication Data

US 2010/0164420 A1    Jul. 1, 2010

(30) Foreign Application Priority Data

Dec. 29, 2008  (TW) .............................. 97151168 A

(51) Int. Cl.
*H02P 25/00*   (2006.01)
*H03K 3/00*    (2006.01)

(52) U.S. Cl.
USPC ............. 318/400.41; 318/400.29; 318/400.38

(58) Field of Classification Search
USPC ........ 318/400.41, 400.29, 400.38; 310/67 R, 310/179, 180
See application file for complete search history.

(56) References Cited

U.S. PATENT DOCUMENTS

| | | | | |
|---|---|---|---|---|
| 6,498,451 | B1 * | 12/2002 | Boules et al. ................. | 318/661 |
| 6,624,541 | B2 * | 9/2003 | Horng et al. ................... | 310/45 |
| 6,856,054 | B2 * | 2/2005 | Shukuri et al. ............... | 310/68 B |

* cited by examiner

*Primary Examiner* — Erick Glass
(74) *Attorney, Agent, or Firm* — Muncy, Geissler, Olds & Lowe, PLLC

(57) ABSTRACT

A brushless direct current (DC) motor includes a rotor, a stator and a driving unit. The rotor includes a plurality of magnetic poles. The stator includes a plurality of upper pole arms and a plurality of lower pole arms. The driving unit includes at least two coils wound on the upper pole arms and the lower pole arms respectively, and the driving unit generates an alternating magnetic field on the stator for driving the rotor.

14 Claims, 6 Drawing Sheets

BRUSHLESS DIRECT CURRENT MOTOR AND DRIVING UNIT THEREOF

CROSS REFERENCE TO RELATED APPLICATIONS

This Non-provisional application claims priority under 35 U.S.C. §119(a) on Patent Application No(s). 097151168, filed in Taiwan, Republic of China on Dec. 29, 2008, the entire contents of which are hereby incorporated by reference.

BACKGROUND OF THE INVENTION

1. Field of Invention

The present invention relates to a brushless direct current (DC) motor and driving unit thereof, and in particular to a brushless DC motor and driving unit thereof including a stator which has a plurality of alternately arranged upper pole arms and lower pole arms.

2. Related Art

Please refer to FIG. 1, which shows a conventional driving circuit of a motor. A driver 10 is electrically connected with a main power Vcc. A bridge circuit 12 includes four switches Q1~Q4 and a coil L, and the bridge circuit 12 is electrically connected with the driver 10 and a main power source Vcc. The driver 10 receives the required voltage from the main power source Vcc and outputs the controlling signal C1 and the controlling signal C2 to the bridge circuit 12 for switching on and switching off the witches Q1~Q4.

The conventional motor is mainly composed of a rotor, a magnet ring disposed in the rotor, a stator and a printed circuit board. The stator includes a plurality of salient poles located at the same level, and the driver 10 and a sensor 14 are disposed on the printed circuit board.

The coil L of the bridge circuit 12 is wound on the stator. When the motor operates, the driver 10 outputs the controlling signal C1 and the controlling signal C2 to the bridge circuit 12 for switching on and switching off the witches Q1~Q4. While the switch Q1 and the switch Q4 of the bridge circuit 12 are turned on and the switch Q2 and the switch Q3 of the bridge circuit 12 are turned off, the electric current flows through the switch Q1, the coil L and the switch Q4. On the other hand, while the switch Q2 and the switch Q3 of the bridge circuit 12 are turned on and the switch Q1 and the switch Q4 of the bridge circuit 12 are turned off, the electric current flows through the switch Q2, the coil L and the switch Q3. The rotor is driven by the electromagnetic field on the stator when the electric current flows through the coil L. The sensor 14 senses the magnetic field of the magnet ring of the rotor and outputs a sensing signal $S_{sense}$ to the driver 10 for adjusting the time that the electric current flowing through the coil L, so as to make a stable electromagnetic field on the stator.

However, the conventional motor has greater Cogging Torque, and there is a short "dead time" during the switch of the flowing direction of the electric current, so that the amplitude of vibration between the highest current and the lowest current is too wide, and the electronic elements in the motor are broken by an excessive Peak Current easily. If the conventional motor is applied to a fan, the multiple-frequency vibration of the motor will be apparent on the fan. In addition, there are only one driving circuit, one single coil L and one set of salient poles in the stator of the conventional motor, if anyone of the electronic elements mentioned above is broken, there will be no electromagnetic field on the stator and the rotor will stop rotating.

SUMMARY OF THE INVENTION

The present invention is to provide a brushless direct current (DC) motor which includes at least a spare driving unit and has low multiple-frequency vibration and low amplitude of vibration between the highest current and the lowest current.

To achieve the above, the present invention discloses a brushless direct current (DC) motor. The brushless direct current motor includes a rotor, a stator and a driving unit. The rotor includes a plurality of magnetic poles. The stator includes a plurality of upper pole arms and a plurality of lower pole arms. The driving unit includes at least two coils wound on the upper pole arms and the lower pole arms respectively, and the driving unit generates an alternating magnetic field on the stator for driving the rotor.

To achieve the above, the present invention also discloses a brushless DC motor. The brushless DC motor includes a rotor, a stator and a driving unit. The rotor includes a plurality of magnetic poles. The stator includes a plurality of pole arms located at the same level. The driving unit includes at least two coils wound on the two adjacent pole arms of the stator respectively, and the driving unit generates an alternating magnetic field on the stator for driving the rotor.

The brushless DC motor of the present invention has at least two coils of a driving unit wound on a plurality of upper pole arms and lower pole arms of a stator for driving a rotor, or has at least two coils of a driving unit wound on two adjacent pole arms of the stator respectively for driving the rotor. As the results, the amplitude of the current supplied into the bridge circuit is low, and the pause time of the rotation of the rotor is practically negligible. Moreover, the driving unit of the brushless DC motor of the present invention includes two bridge circuits and two sensors, so that each bridge circuit and sensor can keep the operation of the driving unit separately even when the other bridge circuit and sensor are broken. Therefore, the stability of the operation of the brushless DC motor is high.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The preferred embodiments of a brushless direct current (DC) motor and driving unit thereof of the present invention will be apparent from the following detailed description, which proceeds with reference to the accompanying drawings, wherein the same references relate to the same elements.

Figure 2A:
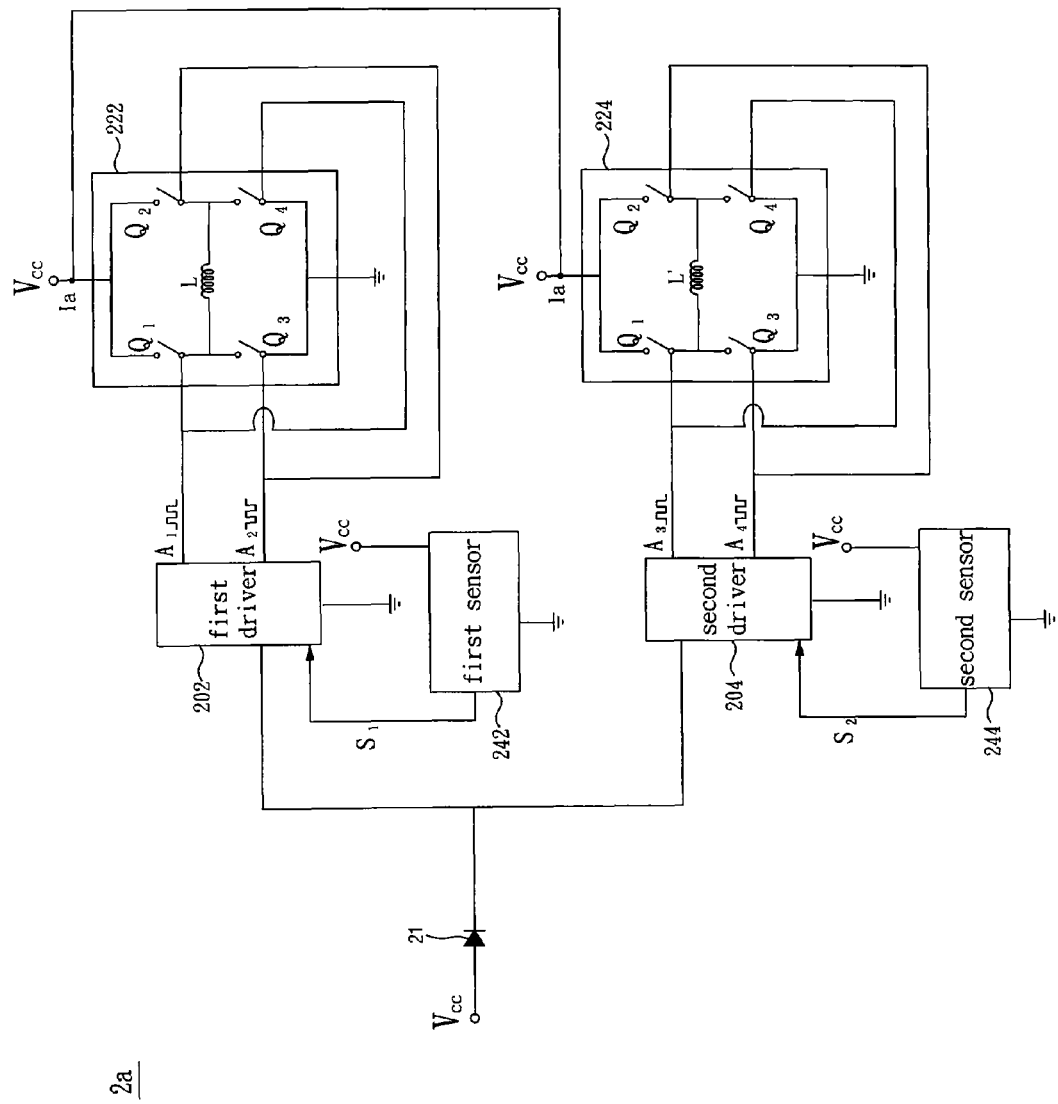
FIG. 2A is a circuit block diagram of a driving unit of the brushless DC motor according to a first embodiment of the present invention.
Figure 2B:
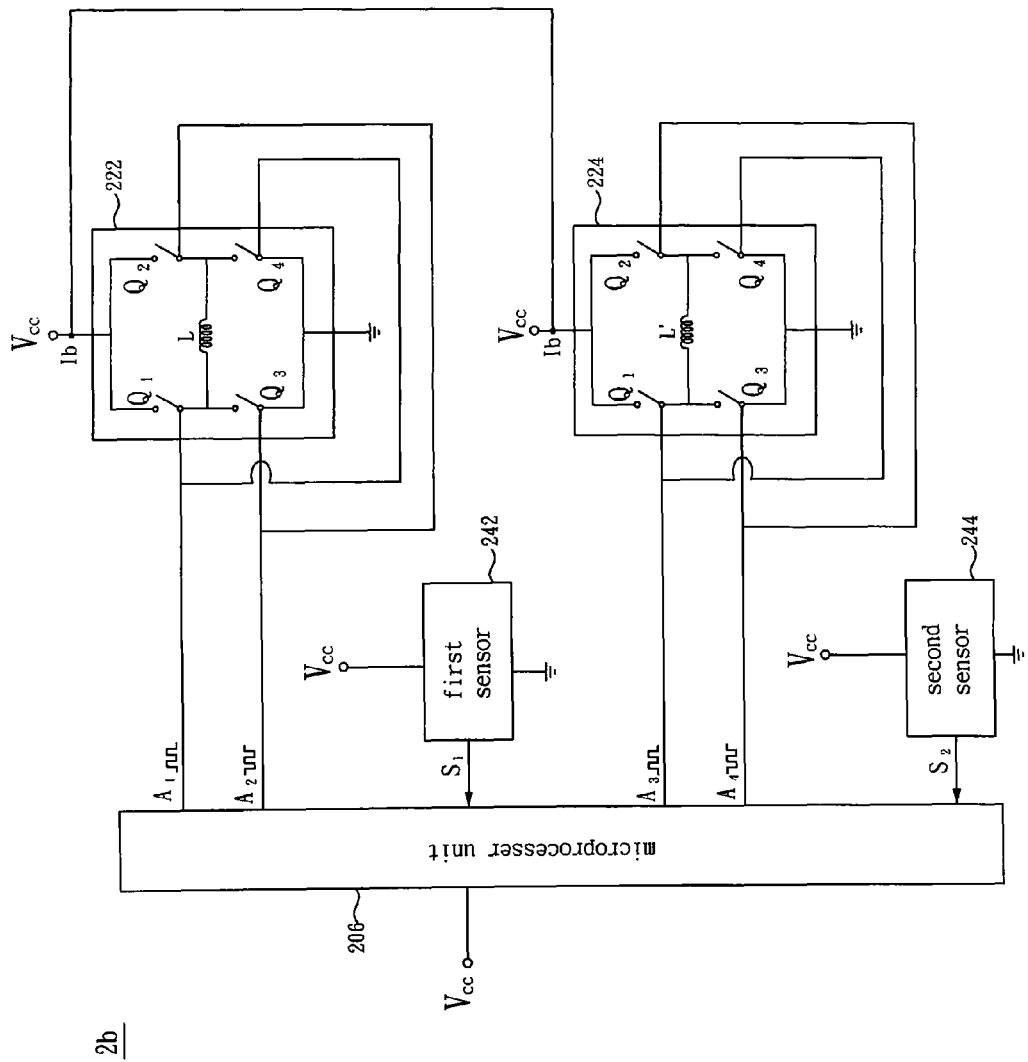
FIG. 2B is a circuit block diagram of another driving unit of the brushless DC motor according to the first embodiment of the present invention.
Figure 2C:
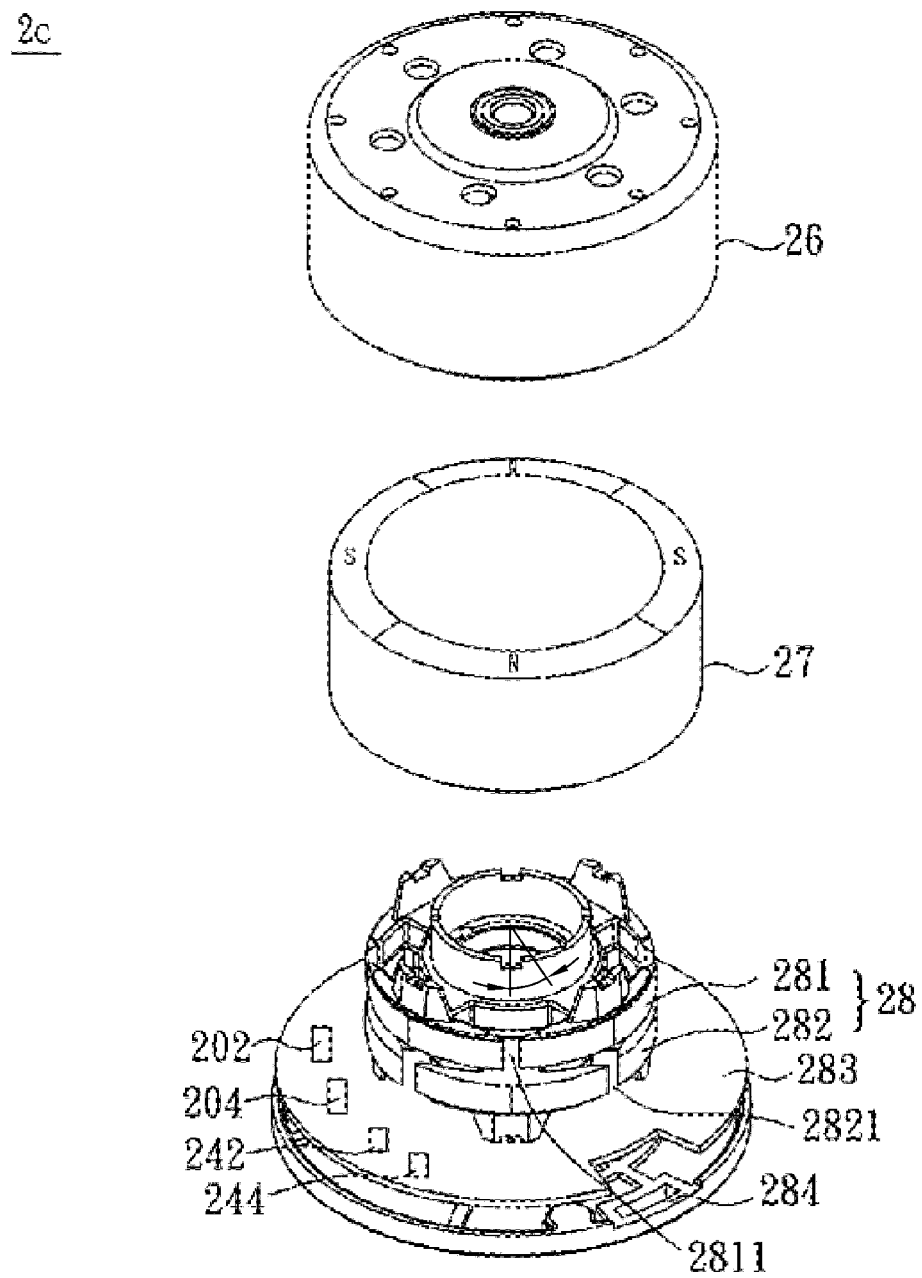
FIG. 2C is an exploded and schematic illustrations of the brushless DC motor according to the first embodiment of the present invention.

Please refer to FIG. 2A and FIG. 2C, a brushless DC motor according to a first embodiment of the present invention includes a driving unit 2a, a rotor 26 and a stator 28. The driving unit 2a includes a power source Vcc, a first driver 202, a first bridge circuit 222, a first sensor 242, a second driver 204, a second bridge circuit 224 and a second sensor 244.

The first driver 202 is electrically connected with the power source Vcc and the first bridge circuit 222 for outputting a first controlling signal A1 and a second controlling signal A2 to the first bridge circuit 222. The first controlling signal A1 and the second controlling signal A2 are pulse voltage signals, and the phase of the first controlling signal A1 and the phase of the second controlling signal A2 are opposite with each other. The second driver 204 is electrically connected with the power source Vcc and the second bridge circuit 224 for outputting a third controlling signal A3 and a fourth controlling signal A4 to the second bridge circuit 224. The third controlling signal A3 and the fourth controlling signal A4 are pulse voltage signals, and the phase of the third controlling signal A3 and the phase of the fourth controlling signal A4 are opposite with each other.

A coil L of the first bridge circuit 222 is wound on the upper pole arms 281 (please refer to FIG. 2C) of the stator 28, and a coil L' of the second bridge circuit 224 is wound on the lower pole arms 282 of the stator 28, so as to generate the alternating magnetic field on the stator 28 cooperatively for driving the rotor 26. The first sensor 242 is electrically connected with the power source Vcc and the first driver 202 for sensing the magnetic poles 27 of the rotor 26(i.e., the magnetic field of the rotor 26 when the rotor 26 rotates) and outputting a first sensing signal S1 to the first driver 202, so as to adjust the phase of the first controlling signal A1 and the phase of the second controlling signal A2 for adjusting the magnetic field on the stator 28 and the rotation rate of the rotor 26.

The second sensor 244 is electrically connected with the power source Vcc and the second driver 204 for sensing the magnetic poles 27 of the rotor 26(i.e., the magnetic field of the rotor 26 when the rotor 26 rotates) and outputting a second sensing signal S2 to the second driver 204, so as to adjust the phase of the third controlling signal A3 and the phase of the fourth controlling signal A4 for adjusting the magnetic field on the stator 28 and the rotation rate of the rotor 26. The first bridge circuit 222 and the second sensor 244 are full-bridge circuits in this embodiment, or the first bridge circuit 222 and the second sensor 244 can be half-bridge circuits in other embodiment. In addition, a Hall direct driving circuit electrically connected with two coils(not shown) can be substituted for the driving unit 2a. At least a driver, a bridge circuit and a sensor are built-in the Hall direct driving circuit.

Or, please refer to FIG. 2B and FIG. 2C, a driving unit 2b can be substituted for the driving unit 2a. The difference between the driving unit 2a and the driving unit 2b is that the first driver 202 and the second driver 204 in the driving unit 2a are replaced by a microprocessor unit 206 in the driving unit 2b. The driving unit 2b includes the power source Vcc, the first bridge circuit 222, the second bridge circuit 224, the first sensor 242, the second sensor 244 and the microprocessor unit 206. The microprocessor unit 206 is electrically connected with the power source Vcc, the first bridge circuit 222 and the second bridge circuit 224 for outputting the first controlling signal A1 and the second controlling signal A2 to the first bridge circuit 222 and outputting the third controlling signal A3 and the fourth controlling signal A4 to the second bridge circuit 224. The first controlling signal A1, the second controlling signal A2, the third controlling signal A3 and the fourth controlling signal A4 are pulse voltage signals, and the phase of the first controlling signal A1 and the phase of the second controlling signal A2 are opposite with each other, and the phase of the third controlling signal A3 and the phase of the fourth controlling signal A4 are opposite with each other.

The coil L of the first bridge circuit 222 is wound on the upper pole arms 281 of the stator 28, and the coil L' of the second bridge circuit 224 is wound on the lower pole arms 282 of the stator 28, so as to generate the alternating magnetic field on the stator 28 cooperatively for driving the rotor 26. The first sensor 242 is electrically connected with the power source Vcc and the microprocessor unit 206 for sensing the magnetic poles 27 of the rotor 26(i.e., the magnetic field of the rotor 26 when the rotor 26 rotates) and outputting a first sensing signal S1 to the microprocessor unit 206, so as to adjust the phase of the first controlling signal A1 and the phase of the second controlling signal A2 for adjusting the magnetic field on the stator 28 and the rotation rate of the rotor 26.

The second sensor 244 is electrically connected with the power source Vcc and the microprocessor unit 206 for sensing the magnetic poles 27 of the rotor 26(i.e., the magnetic field of the rotor 26 when the rotor 26 rotates) and outputting a second sensing signal S2 to the microprocessor unit 206, so as to adjust the phase of the third controlling signal A3 and the phase of the fourth controlling signal A4 for adjusting the magnetic field on the stator 28 and the rotation rate of the rotor 26. The first bridge circuit 222 and the second sensor 244 of the driving unit 2b are full-bridge circuits in this embodiment, or the first bridge circuit 222 and the second sensor 244 can be half-bridge circuits in other embodiment.

Please refer to FIG. 2C, a motor portion 2c of the brushless DC motor includes the rotor 26, the stator 28, a printed circuit board 283 and a base 284. The magnetic poles 27(the poles of the magnetic poles 27 are N, S, N, S in this embodiment) is disposed inside the rotor 26. The stator 28 includes a plurality of upper pole arms 281 and a plurality of lower pole arms 282(there are four upper pole arms 281 and four lower pole arms 282 in this embodiment). The upper pole arms 281 are located above the lower pole arms 282 in FIG. 2C, but it is not limited thereto, the upper pole arms 281 can be located below the lower pole arms 282 in other embodiments. A first gap 2811 is formed between each two adjacent upper pole arms 281, and a second gap 2821 is formed between each two adjacent lower pole arms 282. The first gaps 2811 and the second gaps 2821 are alternately arranged. And the center of each upper pole arm 281 is corresponding to one of the second gaps 2821 respectively, and the center of each lower pole arm 282 is corresponding to one of the first gaps 2811 respectively. An angle is formed between an first imaginary line which connects the center of one of the first gaps 2811 and the center of the stator 28 and an second imaginary line which connects the center of one of the second gaps 2821 adjacent to the first imaginary line and the center of the stator 28, and the angle is obeyed an equation of:

$$\frac{360° \text{ (a circumferenc)}}{\text{the number of the upper pole arms} + \text{the number of the lower pole arms}}.$$

In this embodiment, there are four first gaps 2811 (the number of the upper pole arms 281) and four second gaps 2821 (the number of the lower pole arms 282), so that the angle is 45 degrees.

Besides, if the upper pole arms 281 and the lower pole arms 282 are regarded as a first set of pole arms and a second set of pole arms respectively, the stator 28 can further include a third set of pole arms(not shown) or more above. The driving unit 2a or the driving unit 2b can further include a third coil, a third bridge circuit, a third sensor or elements more above electrically connected with the stator 28 for driving the rotor 26.

Please refer to FIG. 2A and FIG. 2C again. The driving unit 2a drives the rotor 26, and the first driver 202, the second driver 204, the first sensor 242 and the second sensor 244 can be disposed on the printed circuit board 283. The driving unit 2a includes at least two coils L and L' wound on the upper pole arms 281 and the lower pole arms 282 respectively, and the driving unit 2a generates an alternating magnetic field on the stator 28 for driving the rotor 26.

Figure 1:
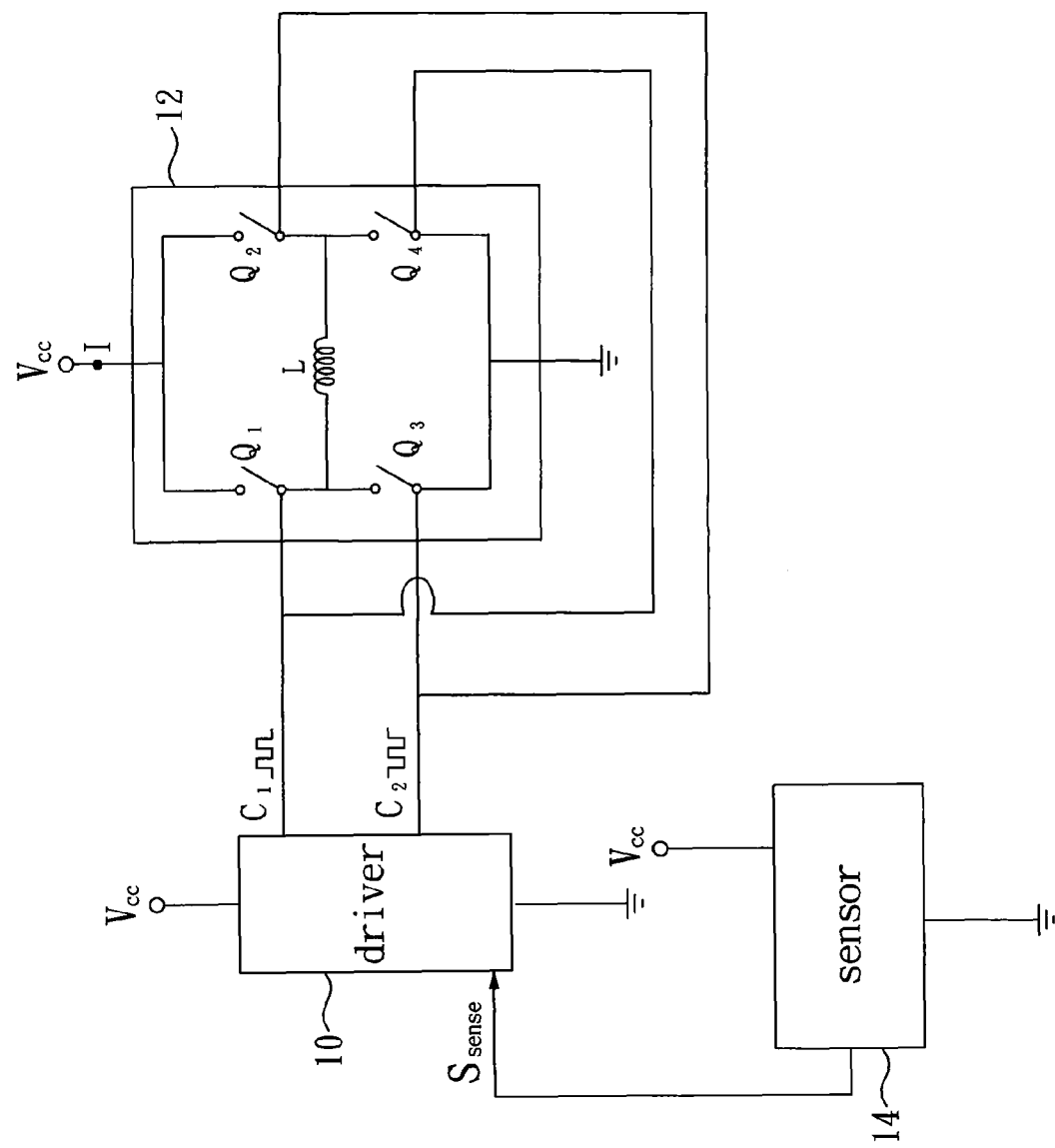
FIG. 1 is a circuit block diagram of a conventional driving circuit of a motor.
Figure 3A:
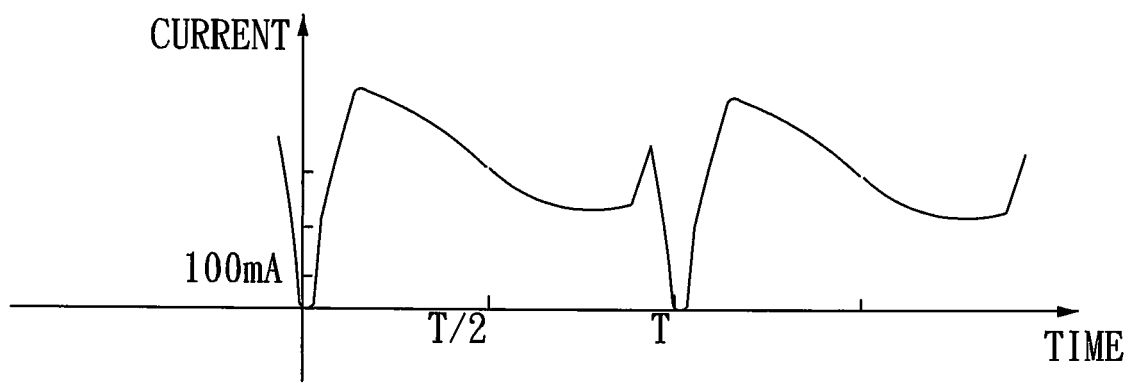
FIG. 3A is a current-time diagram obtained by measuring the current at the point I of FIG. 1.
Figure 3B:
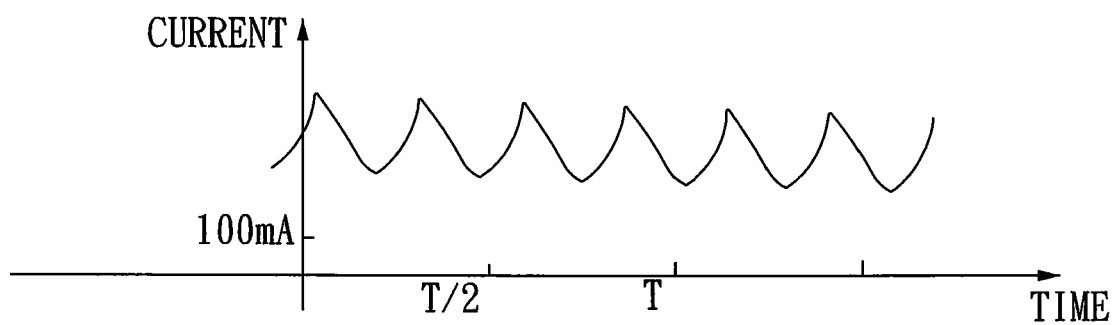
FIG. 3B is a current-time diagram obtained by measuring the current at the point Ia of FIG. 2A.

Please compare FIG. 3A with FIG. 3B. FIG. 3A is a current-time diagram obtained by measuring the current at the point I of FIG. 1, wherein the power source Vcc supplies power into the bridge circuit 12 of the conventional driving circuit. It is clear in FIG. 3A that the amplitude of vibration between the highest current and the lowest current are 400 milliamperes(400 mA), so that the amplitude of the current flowing through the coil L of FIG. 1 is quite wide, and this makes the electronic elements in the motor to be broken easily. Moreover, during the switch of the flowing direction of the current, the waveform is intermittent and more circuitous, such as at the point T of the time axle, there is a short "dead time" which represents the current flowing through the coil L breaks off in a short period. Furthermore, the Cogging Torque of the conventional motor driven by the conventional driving circuit is greater than the Cogging Torque of the brushless DC motor of the present invention.

FIG. 3B is a current-time diagram obtained by measuring the current at the point Ia of FIG. 2A wherein the power source Vcc supplies power into the bridge circuit 222. It is shown in FIG. 3B that the amplitude of vibration between the highest current and the lowest current are only 200 milliamperes(200 mA), which is not too wide. During the switch of the flowing direction of the current, the waveform is more continuous, because the driving unit 2a of the present invention includes two coils L and L', and the "dead time" will not happen on the coil L and the coil L' at the same time. Furthermore, because the first gaps 2811 and the second gaps 2821 of the stator 28 are alternately arranged, the Cogging Torque of the brushless DC motor of the present invention has been reduced obviously.

Figure 4:
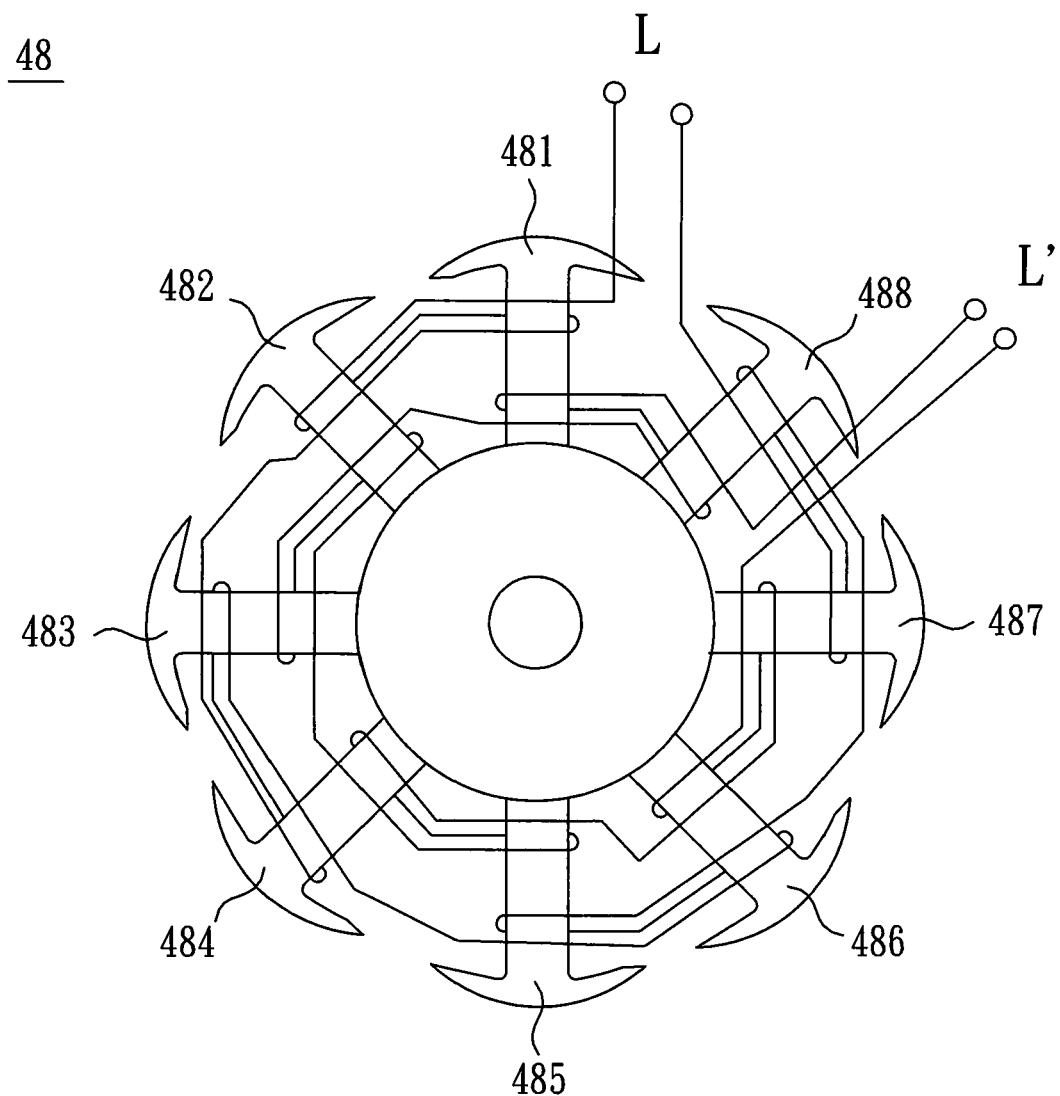
FIG. 4 is a top view of a stator of a brushless DC motor according to a second embodiment of the present invention.

Please refer to FIG. 2A and FIG. 4, similarly, the brushless DC motor according to a second embodiment of the present invention also includes a rotor, a stator and a driving unit, wherein the rotor and the driving unit of the second embodiment are the same with the rotor 26 and the driving unit 2a of the first embodiment. The difference between the first embodiment and the second embodiment is that the stator 48 of the second embodiment includes a plurality of pole arms 481~488, and the pole arms 481~488 are located at the same level. The two coils L and L' of the driving unit 2a are wound on the two adjacent pole arms of the stator 48 respectively. For example, the stator 48 includes a first pole arm 481, a second pole arm 482 and a third pole arm 483 arranged orderly and located at the same level, and the coil L of the driving unit 2a is wound on the first pole arm 481 and the second pole arm 482, and another coil L' of the driving unit 2a is wound on the second pole arm 482 and the third pole arm 483. Or, go into details, the coil L is wound on the first pole arm 481 and the second pole arm 482 firstly, and then be wound on the third pole arm 483 and the fourth pole arm 484, and afterwards be wound on the fifth pole arm 485 and the sixth pole arm 486, finally be wound on the seventh pole arm 487 and the eighth pole arm 488; and the coil L' is wound on the eighth pole arm 488 and the first pole arm 481 firstly, and then be wound on the second pole arm 482 and the third pole arm 483, and afterwards be wound on the fourth pole arm 484 and the fifth pole arm 485, finally be wound on the sixth pole arm 486 and the seventh pole arm 487. The driving unit of the second embodiment also generates an alternating magnetic field on the stator 48 for driving the rotor. In this embodiment, the number of the pole arms of the stator 48 divided by the number of the coils equals the number of the magnetic poles of the rotor. Please refer to FIG. 4, the number of the pole arms of the stator 48 is eight, and the number of the coils of the driving unit is two, so that the number of the magnetic poles of the rotor is four(which are poles of N, S, N, S).

The coil winding method in this embodiment winding the coil L and the coil L' on the pole arms of the stator 48 respectively, this method also reduces the amplitude of vibration between the highest current and the lowest current supplied into the first bridge circuit 222 and the second bridge circuit 224, so as to prevent the damage of the electronic elements in the motor caused by an excessive Peak Current. And the waveform is also more continuous during the switch of the flowing direction of the current in this embodiment.

In summary, the brushless DC motor of the present invention has at least two coils of a driving unit wound on a plurality of upper pole arms and lower pole arms of a stator for driving a rotor, or has at least two coils of a driving unit wound on two adjacent pole arms of the stator respectively for driving the rotor. So that the amplitude of the current supplied into the bridge circuit is low, and the pause time of the rotation of the rotor is practically negligible. Moreover, the driving unit of the brushless DC motor of the present invention includes two bridge circuits and two sensors, so that each bridge circuit and sensor can keep the operation of the driving unit separately even when the other bridge circuit and sensor are broken, i.e., the stability of the operation of the brushless DC motor is high. When the brushless DC motor of the present invention is applied to a fan, the stability of the operation of the fan is undoubtedly high.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A brushless direct current (DC) motor, comprising:
a rotor, the rotor comprising a plurality of magnetic poles;
a stator, comprising a plurality of upper pole arms and a plurality of lower pole arms; and
a driving unit, comprising at least two individual coils and at least two individual drivers for individually driving the rotor, wherein the at least two individual coils separate from each other are wound on the upper pole arms and the lower pole arms respectively, the at least two individual drivers are coupled to the at least two individual coils respectively, and the driving unit generates an alternating magnetic field on the stator for driving the rotor to rotate.

2. The brushless DC motor according to claim 1, wherein the brushless DC motor is applied to a fan, and a plurality of blades are disposed around the rotor.

3. The brushless DC motor according to claim 1, wherein a first gap is formed between each two adjacent upper pole arms of the stator, a second gap is formed between each two adjacent lower pole arms of the stator, and the first gaps and the second gaps are alternately arranged.

4. The brushless DC motor according to claim 3, wherein a center of each upper pole arm of the stator is corresponding to one of the second gaps respectively, and a center of each lower pole arm of the stator is corresponding to one of the first gaps respectively.

5. The brushless DC motor according to claim 3, wherein an angle is formed between an first imaginary line which connects a center of one of the first gaps and a center of the stator and an second imaginary line which connects a center of one of the second gaps adjacent to the first imaginary line and the center of the stator, and the angle is obeyed an equation of:

$$\frac{360° \text{ (a } circumferenc)}{\text{the number of the upper pole arms} + \text{the number of the lower pole arms}}.$$

6. The brushless DC motor according to claim 1, wherein the driving unit further comprises:
a power source;
a first bridge circuit, comprising one of the coils, wherein the at least two individual drivers has a first driver electrically connected with the power source and the first bridge circuit for outputting a first controlling signal and a second controlling signal to the first bridge circuit, wherein the phase of the first controlling signal and the phase of the second controlling signal are opposite with each other; and
a second bridge circuit, comprising another one of the coils, wherein the at least two individual drivers has a second driver electrically connected with the power source and the second bridge circuit for outputting a third controlling signal and a fourth controlling signal to the second bridge circuit, wherein the phase of the third controlling signal and the phase of the fourth controlling signal are opposite with each other;
wherein the coil of the first bridge circuit is wound on the upper pole arms of the stator, and the coil of the second bridge circuit is wound on the lower pole arms of the stator, so as to generate the alternating magnetic field on the stator cooperatively for driving the rotor.

7. The brushless DC motor according to claim 6, wherein the first bridge circuit and the second bridge circuit are full-bridge circuits or half-bridge circuits.

8. The brushless DC motor according to claim 6, wherein the driving unit further comprises:
a first sensor electrically connected with the first driver for sensing the magnetic poles of the rotor and outputting a first sensing signal to the first driver, so as to adjust the phase of the first controlling signal and the phase of the second controlling signal for adjusting the magnetic field on the stator and the rotation rate of the rotor; and
a second sensor electrically connected with the second driver for sensing the magnetic poles of the rotor and outputting a second sensing signal to the second driver, so as to adjust the phase of the third controlling signal and the phase of the fourth controlling signal for adjusting the magnetic field on the stator and the rotation rate of the rotor.

9. The brushless DC motor according to claim 1, wherein the driving unit further comprises:
a power source;
a first bridge circuit, comprising one of the coils;
a second bridge circuit, comprising another one of the coils; and
a microprocessor unit electrically connected with the power source, the first bridge circuit and the second bridge circuit for outputting a first controlling signal and a second controlling signal to the first bridge circuit and outputting a third controlling signal and a fourth controlling signal to the second bridge circuit, wherein the phase of the first controlling signal and the phase of the second controlling signal are opposite with each other, and the phase of the third controlling signal and the phase of the fourth controlling signal are opposite with each other.

10. The brushless DC motor according to claim 9, wherein the first bridge circuit and the second bridge circuit are full-bridge circuits or half-bridge circuits.

11. The brushless DC motor according to claim 9, wherein the driving unit further comprises:
a first sensor electrically connected with the microprocessor unit for sensing the magnetic poles of the rotor and outputting a first sensing signal to the first driver, so as to adjust the phase of the first controlling signal and the phase of the second controlling signal for adjusting the magnetic field on the stator and the rotation rate of the rotor; and
a second sensor electrically connected with the microprocessor unit for sensing the magnetic poles of the rotor and outputting a second sensing signal to the second driver, so as to adjust the phase of the third controlling signal and the phase of the fourth controlling signal for adjusting the magnetic field on the stator and the rotation rate of the rotor.

12. A driving unit applied to a brushless DC motor, the brushless DC motor comprises a rotor and a stator, the rotor includes a plurality of magnetic poles, the stator comprises a plurality of upper pole arms and a plurality of lower pole arms, the driving unit comprises at least two individual coils and at least two individual drivers for individually driving the rotor, wherein the at least two individual coils separate from each other are wound on the upper pole arms and the lower pole arms respectively, the at least two individual drivers are coupled to the at least two individual coils respectively, and the driving unit generates an alternating magnetic field on the stator for driving the rotor.

13. The driving unit according to claim 12, further comprising:
a power source;
a first bridge circuit, comprising one of the coils, wherein the at least two individual drivers has a first driver electrically connected with the power source and the first bridge circuit for outputting a first controlling signal and a second controlling signal to the first bridge circuit, wherein the phase of the first controlling signal and the phase of the second controlling signal are opposite with each other; and
a second bridge circuit, comprising another one of the coils, wherein the at least two individual drivers has a second driver electrically connected with the power source and the second bridge circuit for outputting a third controlling signal and a fourth controlling signal to the second bridge circuit, wherein the phase of the third controlling signal and the phase of the fourth controlling signal are opposite with each other;

wherein the coil of the first bridge circuit is wound on the upper pole arms of the stator, and the coil of the second bridge circuit is wound on the lower pole arms of the stator, so as to generate the alternating magnetic field on the stator cooperatively for driving the rotor.

14. The driving unit according to claim 12, further comprising:

a power source;

a first bridge circuit, comprising one of the coils;

a second bridge circuit, comprising another one of the coils; and a microprocessor unit electrically connected with the power source, the first bridge circuit and the second bridge circuit for outputting a first controlling signal and a second controlling signal to the first bridge circuit and outputting a third controlling signal and a fourth controlling signal to the second bridge circuit, wherein the phase of the first controlling signal and the phase of the second controlling signal are opposite with each other, and the phase of the third controlling signal and the phase of the fourth controlling signal are opposite with each other.

* * * * *